UNITED STATES PATENT OFFICE.

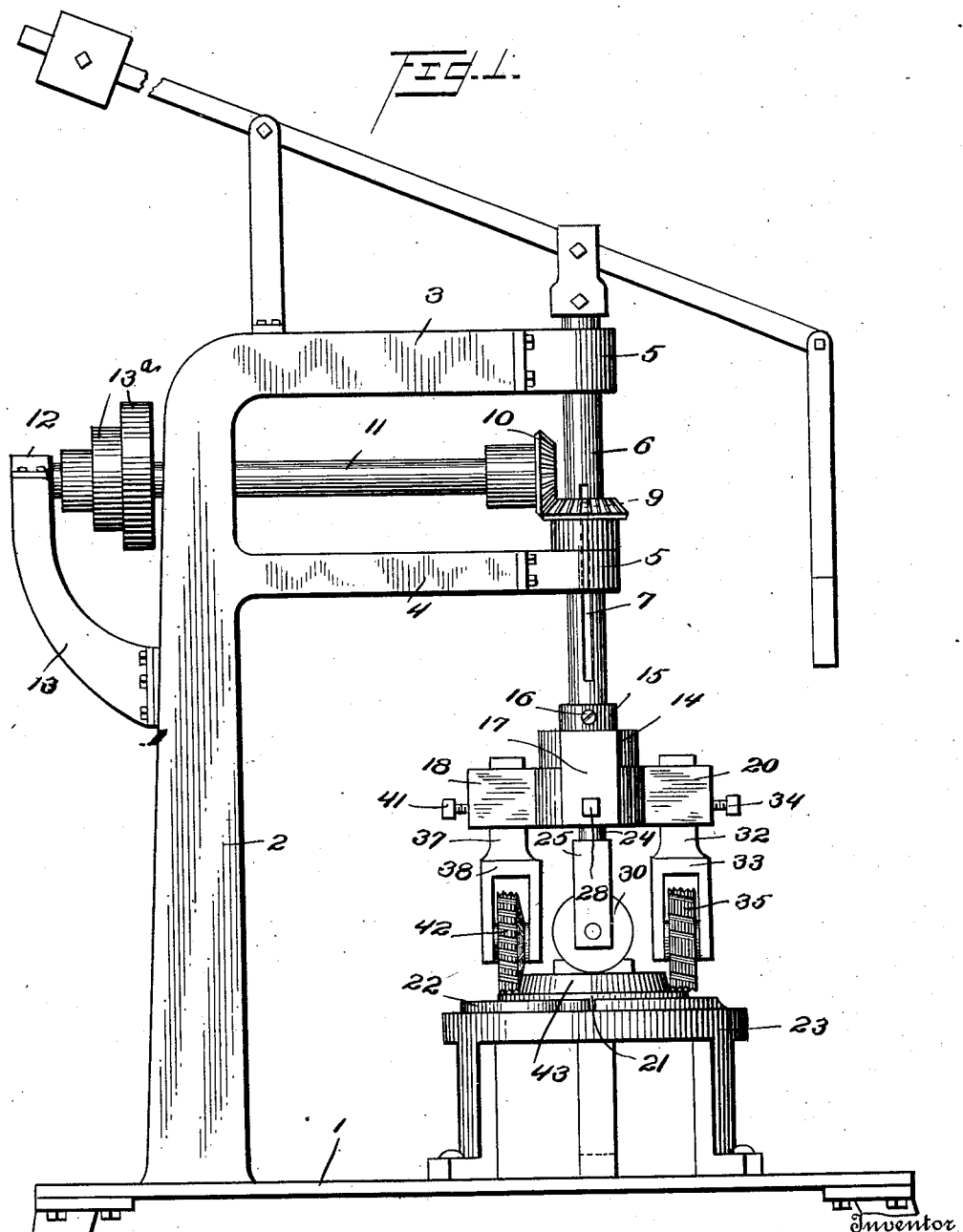

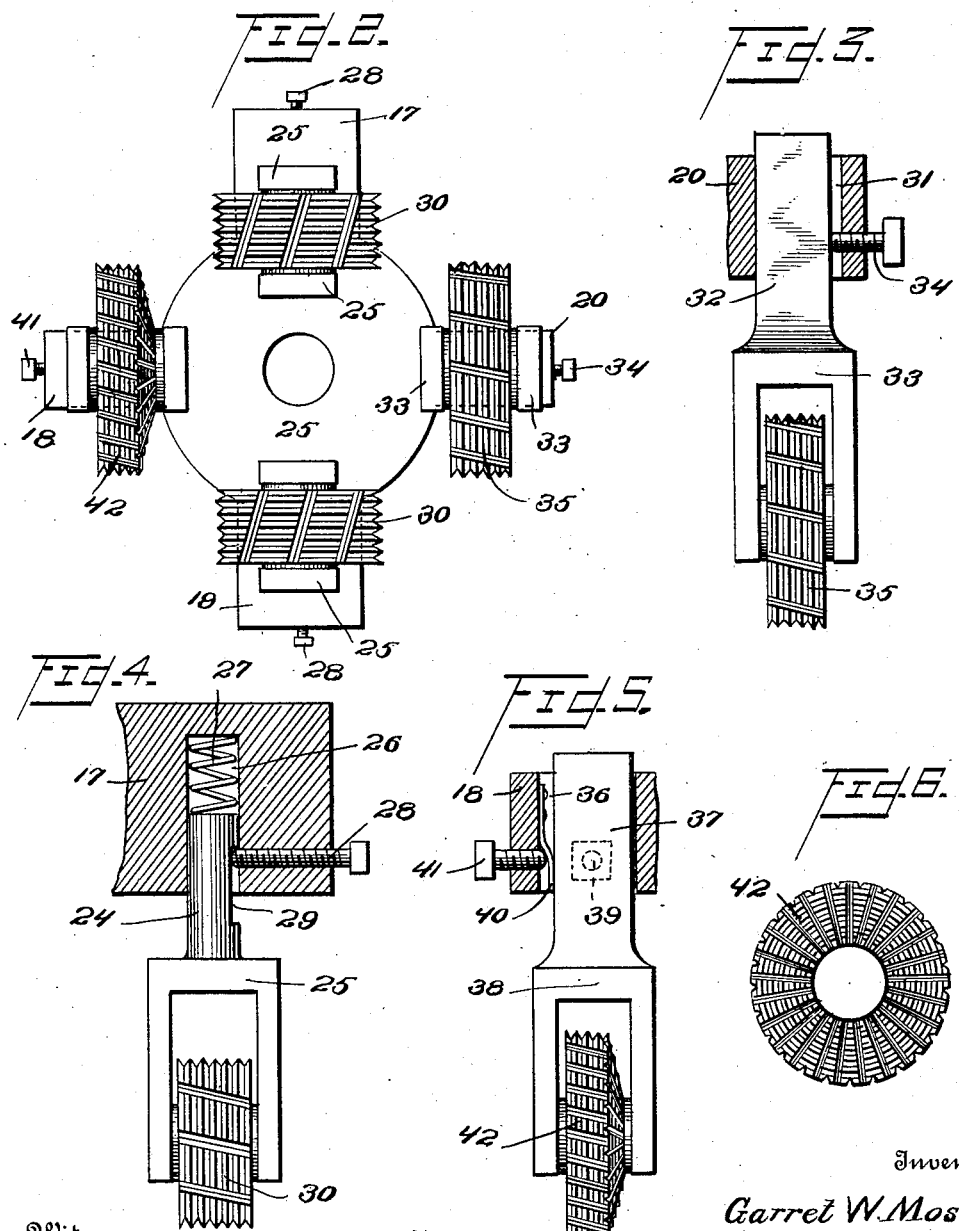

GARRET W. MOSER, OF NORRISTOWN, PENNSYLVANIA, ASSIGNOR OF ONE-THIRD TO JACOB MOSER, OF NORRISTOWN, PENNSYLVANIA, AND ONE-THIRD TO ISAAC A. MOSER, OF SCHWENKSVILLE, PENNSYLVANIA.

APPARATUS FOR CUTTING WASHERS FROM BOILER-CAPS.

1,011,991.  Specification of Letters Patent.  Patented Dec. 19, 1911.

Application filed March 13, 1911. Serial No. 614,035.

*To all whom it may concern:*

Be it known that I, GARRET W. MOSER, a citizen of the United States, residing at Norristown, in the county of Montgomery and State of Pennsylvania, have invented certain new and useful Improvements in Apparatus for Cutting Washers from Boiler-Caps, of which the following is a specification.

My invention relates to improvements in apparatus for cutting washers from boiler caps, the object of the invention being to provide an improved cutting tool which will completely cut the washer from the cap and leave the cap clean and smooth ready for further use.

A further object is to provide an improved cutter which will accommodate itself to the varying uneven surfaces of boiler caps when washers are stuck thereon.

With these and other objects in view, the invention consists in certain novel features of construction and combinations and arrangements of parts, as will be more fully hereinafter described and pointed out in the claims.

In the accompanying drawings: Figure 1, is a view in elevation illustrating my improvements. Fig. 2, is a bottom plan view of the cutter. Fig. 3, is a sectional elevation of one of the cutting wheels and its mounting. Figs. 4 and 5 are similar views of other cutting wheels and their mountings, and Fig. 6, is a view in side elevation of the cutting wheel shown in Fig. 5.

In carrying out my improvements, various forms of supporting mechanism might be provided. I have illustrated one structure, but am not, limited thereto, such structure being shown for purposes of illustration only.

1, represents a table or support on which a standard 2 is fixed, said standard provided with integral parallel horizontal arms 3 and 4, on the outer end of which bearings 5 are secured. These bearings 5 afford rotary mounting for a vertical shaft 6, having a longitudinal groove 7 therein to receive a key 8 in a beveled pinion 9. This pinion 9 meshes with a similar beveled pinion 10 on a horizontal shaft 11, which latter is supported at its outer end in a bearing 12 at the upper end of an arm 13, fixed to standard 2 and between this bearing 12 and the standard 2, drive pulleys 13ª are fixed to the shaft which are adapted to be driven from any source of power.

On the lower end of shaft 6, my improved cutter is secured, and comprises a cross shaped block 14 having a central sleeve 15 to receive shaft 6, and secured thereon by means of a set screw 16.

The four arms 17, 18, 19, and 20, of the block 14 provide mountings for cutters, as will be hereinafter explained for cutting an ordinary boiler cap 21, which is secured by a clamp 22 to a support 23 on table 1. In the arms 17 and 19, which are opposite each other, the cylindrical shanks 24 of forks 25 are mounted, said shanks 24 projected up into closed pockets 26 in the arms 17 and 19. In these pockets 26, coiled springs 27 are located and exert downward pressure on the forks, the longitudinal movement of said forks being controlled by set screws 28, which project into longitudinal grooves 29 in the shanks 24.

In the forks 25, rotary cutters 30 are mounted. These cutters may be variously made and are preferably of hard steel, grooved longitudinally and transversely as shown, forming sharp cutting edges. By reference particularly to Fig. 2, it will be noted that one of these cutting wheels 30 is positioned farther from the center of the cutting tool than is the other, so that they pass through somewhat different circles, and cut a different path on the surface of the boiler cap.

The arm 20 is provided with an angular opening 31, through which the angular shank 32 of a fork 33 projects, and is fixed in said opening by means of a set screw 34. A rotary cutter 35, mounted in the fork 33, is adapted to run upon the larger diameter of the boiler cap, and directly upon the washer which fits this larger portion.

The arm 18 is provided with an angular opening 36, in which the angular shank 37 of a fork 38 is mounted. This shank 37 is held against vertical movement, but is permitted a certain amount of pivotal movement by means of a set screw 39 which screws through the side of arm 18, and against shank 37. This pivotal movement is resisted by a spring 40, the tension of which is adjusted by a set screw 41, so that the fork 38 is normally held in a vertical position. In this fork 38, a rotary cutter 42 is mounted, and not only is its periphery grooved longitudinally and transversely so as to cut, but its side face is also grooved concentrically and radially as shown in Fig. 6, and is beveled to conform to the beveled portion 43 of the boiler cap, which connects the two diameters thereof.

In operation therefore, the cutting tool is lowered onto the boiler cap, and when pressure is applied to the boiler cap, the several cutters will assume their cutting engagement against the cap, and when revolved, the cutters will cut all of the surfaces of the cap, thoroughly cleaning them and removing any washer or portion thereof which may adhere to the surface of the cap. The springs 27 and 40 allow the several cutting tools to assume their proper positions, and cut regardless of the uneven surfaces they may come in contact with. This pivotal mounting of the cutter 42 is permitted so that the cutter may conform to the irregularities in the surface of the cap. For example, some caps are more heavily corroded than others, and by reason of the pivotal connection, the cutter will engage the cap and will cut the same clean, the spring compelling it to move inwardly as it cuts, and gradually wear the surface down to its original shape. While therefore, the cutters 30 both cut the surface of the boiler cap at its smaller diameter, cutters 35 and 42 cut against the surface at the larger diameter, and cutter 42 also cuts against the bevel or inclined surface of the cap.

By means of a cutter of this character, boiler caps may be quickly cleaned ready for further use, and I do not limit myself to the particular means for operating the cutter, nor to the particular support for the boiler cap, but consider myself at liberty to make such changes and alterations as fairly fall within the spirit and scope of the appended claims.

Having thus described my invention, what I claim as new and desire to secure by Letters Patent is:

1. A device of the character described, comprising a block, and a plurality of forks mounted in said block, of rotary cutters supported in said forks, and elastic mounting for certain of said forks, substantially as described.

2. A device of the character described, comprising a block, and a plurality of forks mounted in said block, of rotary cutters supported in said forks, elastic means permitting vertical movement of two of said forks, said elastically mounted forks supported to turn in a smaller arc than the other of said forks, substantially as described.

3. A device of the character described, comprising a block, and a plurality of forks mounted in said block, of rotary cutters supported in said forks, elastic means permitting vertical movement of two of said forks, said elastically mounted forks supported to turn in a smaller arc than the other of said forks, one of said last-mentioned forks permitted elastic pivotal movement, and the rotary cutter in said pivotal movable fork having a beveled side cutting face, substantially as described.

4. In a device of the character described, the combination with a block, comprising four radially disposed arms, two of said arms having pockets therein, and the other two having angular openings therethrough, of two forks, said forks having shanks mounted in said pockets, springs in said pockets bearing downward on said shanks, said shanks having recesses therein, set screws in the arms projecting into the said recesses limiting the vertical movement of said shanks and forks, two forks, angular shanks on said forks positioned in the angular openings, means rigidly securing one of said shanks, means pivotally securing the other of said last-mentioned shanks, a spring normally holding said shank in vertical position, rotary cutters in all of said shanks, said rotary cutters positioned at different radial lengths from the axis of said device, and having annular cutting surfaces, the rotary cutter of the pivoted shank having a beveled cutting side face, substantially as described.

5. A device of the character described, comprising a block, and a plurality of forks mounted in said block, of rotary cutters supported in said forks, elastic mounting for certain of said forks, means for supporting a boiler cap in position below said cutters, and means supporting and transmitting a rotary motion to said block, substantially as described.

6. A device of the character described, comprising a block, and a plurality of forks mounted in said block, of rotary cutters supported in said forks, elastic means permitting vertical movement of two of said forks, said elastically mounted forks supported to turn in a smaller arc than the other of said forks, means for supporting a boiler cap in position below said cutters, and means supporting and transmitting a rotary motion to said block, substantially as described.

7. A device of the character described, comprising a block, and a plurality of forks mounted in said block, of rotary cutters supported in said forks, elastic means permitting vertical movement of two of said forks, said elastically mounted forks supported to turn in a smaller arc than the other of said forks, one of said last-mentioned forks permitting spring held pivotal movement, and the rotary cutter in said pivotal movable fork having a beveled side cutting face, means for supporting a boiler cap in position below said cutters, and means supporting and transmitting a rotary motion to said block, substantially as described.

8. In a device of the character described, the combination with a block, comprising four radially disposed arms, two of said arms having pockets therein, and the other two having angular openings therethrough, of two forks, said forks having shanks mounted in said pockets, springs in said pockets bearing downward on said shanks, said shanks having recesses therein, set screws in the arms projecting into the said recesses limiting the vertical movement of said shanks and forks, two forks, angular shanks on said forks positioned in the angular openings, means rigidly securing one of said shanks, means pivotally securing the other of said last-mentioned shanks, a spring normally holding said shank in vertical position, rotary cutters in all of said shanks, said rotary cutters positioned at different radial lengths from the axis of said device, and having annular cutting surfaces, the rotary cutter of the pivoted shank having a beveled cutting side face, means for supporting a boiler cap in position below said cutters, and means supporting and transmitting a rotary motion to said block, substantially as described.

In testimony whereof I have signed my name to this specification in the presence of two subscribing witnesses.

GARRET W. MOSER.

Witnesses:
 A. CLARENCE EMERY,
 S. H. ORR.

---

Copies of this patent may be obtained for five cents each, by addressing the "Commissioner of Patents, Washington, D. C."